(12) United States Patent
Krishnamoorthy

(10) Patent No.: US 10,824,917 B2
(45) Date of Patent: Nov. 3, 2020

(54) TRANSFORMATION OF ELECTRONIC DOCUMENTS BY LOW-RESOLUTION INTELLIGENT UP-SAMPLING

(71) Applicant: Bank of America Corporation, Charlotte, NC (US)

(72) Inventor: Madhusudhanan Krishnamoorthy, Chennai (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 140 days.

(21) Appl. No.: 16/207,539

(22) Filed: Dec. 3, 2018

(65) Prior Publication Data

US 2020/0175341 A1   Jun. 4, 2020

(51) Int. Cl.
| | |
|---|---|
| G06K 9/62 | (2006.01) |
| G06N 3/08 | (2006.01) |
| G06K 9/00 | (2006.01) |
| G06T 3/40 | (2006.01) |

(52) U.S. Cl.
CPC ....... G06K 9/6263 (2013.01); G06K 9/00483 (2013.01); G06K 9/6256 (2013.01); G06N 3/08 (2013.01); G06T 3/4053 (2013.01); G06K 2209/01 (2013.01)

(58) Field of Classification Search
CPC ............. G06K 9/6263; G06K 9/00483; G06K 9/6256; G06K 2209/01; G06T 3/4053; G06N 3/08
USPC ....................................................... 382/157
See application file for complete search history.

(56) References Cited

U.S. PATENT DOCUMENTS

| | | |
|---|---|---|
| 6,518,894 B2 | 2/2003 | Freidhof |
| 7,181,042 B2 | 2/2007 | Tian |
| 7,210,100 B2 | 4/2007 | Berger et al. |
| 7,324,036 B2 | 1/2008 | Petre et al. |
| 7,489,415 B2 | 2/2009 | Furuta et al. |
| 8,134,637 B2 | 3/2012 | Rossbach et al. |
| 8,666,174 B2 | 3/2014 | Vincent et al. |
| 9,514,376 B2 | 12/2016 | Cuthbert et al. |
| 9,514,377 B2 | 12/2016 | Cuthbert et al. |
| 9,984,287 B2 | 5/2018 | George et al. |
| 2004/0117733 A1 | 6/2004 | Moreau et al. |
| 2006/0280271 A1 | 12/2006 | Oshikiri |
| 2007/0223577 A1 | 9/2007 | Ehara et al. |
| 2007/0271092 A1 | 11/2007 | Ehara et al. |
| 2008/0309778 A1 | 12/2008 | Tabatabai et al. |
| 2009/0231487 A1 | 9/2009 | Nakagawa et al. |
| 2011/0296291 A1 | 12/2011 | Melkinov et al. |
| 2012/0294369 A1 | 11/2012 | Bhagavathy et al. |
| 2018/0025222 A1 | 1/2018 | Yellapragada et al. |
| 2018/0101726 A1 | 4/2018 | Wang et al. |
| 2019/0130231 A1* | 5/2019 | Liu ................. G06K 9/6277 |
| 2019/0311227 A1* | 10/2019 | Kriegman ............ G06K 9/6273 |

(Continued)

*Primary Examiner* — Juan A Torres
(74) *Attorney, Agent, or Firm* — Michael A. Springs; Moore & Van Allen PLLC; James C. Edwards

(57) ABSTRACT

Embodiments of the invention are directed to systems, methods, and computer program products for approaching less spatial resolution documents with parameterized and evolution linear units and momentum-driven SGD to accelerate the training phase of the system further by transformation of electronic documents by low-resolution intelligent up-sampling. An up-sampling layer is integrated with dots-per-inch (DPI) to validate whether the desirable output is obtained.

20 Claims, 3 Drawing Sheets

(56) References Cited

U.S. PATENT DOCUMENTS

2020/0019863 A1* 1/2020 Dua .................. G06F 40/30
2020/0074515 A1* 3/2020 Ghatage ............. G06Q 30/04
2020/0082270 A1* 3/2020 Gu .................... G06F 21/606

* cited by examiner

TRANSFORMATION OF ELECTRONIC DOCUMENTS BY LOW-RESOLUTION INTELLIGENT UP-SAMPLING

FIELD OF THE INVENTION

The present invention generally relates to the field of processing scanned documents.

BACKGROUND

The accuracy of optical character recognition (OCR) on low-resolution, scanned documents is very low. Institutions, particularly financial institutions, handle low-resolution, scanned documents frequently in their daily interactions. Because of the low resolution of such documents, an automated pipeline within a document processing system may require manual intervention and/or error mitigation actions. Such difficulties may cause large delays in business workflows and service level agreement (SLA) impacts.

Most of the existing deep learning super resolution (SR) techniques are designed for natural images and their efficiencies are below par with respect to document images. Another drawback to such techniques is that they are also computationally intensive.

The present invention circumvents all the above-noted issues using a construction of dynamic computational graph and leveraging varying hyper parameters including activation functions, momentum-based stochastic gradient descent (SGD) or incremental gradient descent, which is an iterative method for optimizing a differentiable objection function, a peak-signal-to-noise ratio (PSNR) that provides feedback to training layers, and OCR validation.

The previous discussion of the background to the invention is provided for illustrative purposes only and is not an acknowledgement or admission that any of the material referred to is or was part of the common general knowledge as at the priority date of the application.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention comprise systems, methods, and computer program products that address the foregoing deficiencies of conventional systems, addresses the foregoing identified needs and provides improvements to existing technology by providing an innovative system, method and computer program product for transformation of electronic documents by low-resolution intelligent up-sampling. Typically the system comprises: at least one memory device with computer-readable program code stored thereon; at least one communication device; at least one processing device operatively coupled to the at least one memory device and the at least one communication device. Executing the computer-readable code is configured to cause the at least one processing device to: capture a static image of a visual representation of a document, thereby resulting in an electronic document having data; train the system by: performing an initialization comprising producing randomized weights for a deep neural network model; applying at least one activation function to train the deep neural network model; and applying a gradient to the model; and to apply the model to the data to produce a transformed electronic document.

In some embodiments, executing the computer-readable code is configured to further cause the at least one processing device to apply the at least one activation function comprising converting a linear output from the weighted values of the initialization into non-linear values.

In some embodiments, executing the computer-readable code is configured to further cause the at least one processing device to randomly select at least from a rectified linear unit (RELU) function, a parametric RELU (PRELU) function, or an exponential linear unit (ELU) function for application as the at least one activation function.

In some embodiments, executing the computer-readable code is configured to further cause the at least one processing device to select the RELU function as the at least one activation function, wherein the RELU function comprises a normal activation function that converts all parameters of the electronic document into non-linear parameters.

In some embodiments, executing the computer-readable code is configured to further cause the at least one processing device to select the PRELU function as the at least one activation function, wherein the PRELU function comprises selecting some parameters of the electronic document based on the weights, converting the selected parameters to non-linear parameters, and retaining the non-selected parameters as linear parameters.

In some embodiments, executing the computer-readable code is configured to further cause the at least one processing device to select the ELU function as the at least one activation function, wherein the ELU function comprises selecting some parameters of the electronic document based on the weights, converting the selected parameters to non-linear parameters.

In some embodiments, executing the computer-readable code is configured to further cause the at least one processing device to apply a momentum-based gradient descent to the model, thereby optimizing the model through differential calculus. In some such embodiments, applying the gradient descent comprises performing multiple iterations of the gradient descent until a difference between a pre-calculated prediction and a gradient descent output is below a predetermined threshold. In other such embodiments, the gradient descent is based on a learning rate.

In some embodiments, the gradient descent is based on an epochs number comprising a user input indicating a maximum number of the multiple iterations.

In some embodiments, applying the gradient descent comprises filters that are implemented to determine that all critical parameters have been captured by the model.

In some embodiments, applying the gradient descent further comprises automatically updating the learning rate as necessary to ensure that the critical parameters have been captured. In some such embodiments, executing the computer-readable code is configured to further cause the at least one processing device to perform a peak signal-to-noise ratio (PSNR) test by accessing the data progressing through the model and identifying its resolution and comparing it to a predetermined threshold. In some of these embodiments, executing the computer-readable code is configured to further cause the at least one processing device to, if the resolution is below the predetermined threshold, then implementing a feedback loop for re-iteration of the model,
} whereby the data is transferred back for re-applying of the activation function, re-applying the momentum-based gradient descent and re-testing the PSNR. In some such embodiments, executing the computer-readable code is configured to further cause the at least one processing device to update the epochs, the filters and the learning rate in response to implementing the feedback loop.

In some embodiments, executing the computer-readable code is configured to further cause the at least one processing device to determine that the model is ready for deployment; and in response, deploy the model for receiving new low-resolution electronic documents and up-sampling those documents, thereby transforming the low-resolution electronic documents into generated high-resolution documents.

In some such embodiments, determining that the model is ready for deployment comprises running a low-resolution electronic document of known source through the model so that a test high-resolution document is generated; comparing differences between the test high-resolution document to a known high-resolution document of the known source; and when the differences surpass a predetermined threshold, the model has failed the test and must be retrained.

In other such embodiments, determining that the model is ready for deployment comprises running a low-resolution electronic document of known source through the model so that a test high-resolution document is generated; comparing differences between the test high-resolution document to a known high-resolution document of the known source; and when the differences are less than a predetermined threshold, the model has passed the test and may be deployed for working mode.

In some embodiments, a computer program product for transformation of electronic documents by low-resolution intelligent up-sampling has a non-transitory computer-readable storage medium having computer-executable instructions to capture a static image of a visual representation of a document, thereby resulting in an electronic document having data; train the system by performing an initialization comprising producing randomized weights for a deep neural network model; applying at least one activation function to train the deep neural network model; and applying a gradient to the model; and to apply the model to the data to produce a transformed electronic document.

In some embodiments, a computer implemented method for transformation of electronic documents by low-resolution intelligent up-sampling, the computer implemented method comprises capturing a static image of a visual representation of a document, thereby resulting in an electronic document having data; training the system by performing an initialization comprising producing randomized weights for a deep neural network model; applying at least one activation function to train the deep neural network model; and applying a gradient to the model; and applying the model to the data to produce a transformed electronic document.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
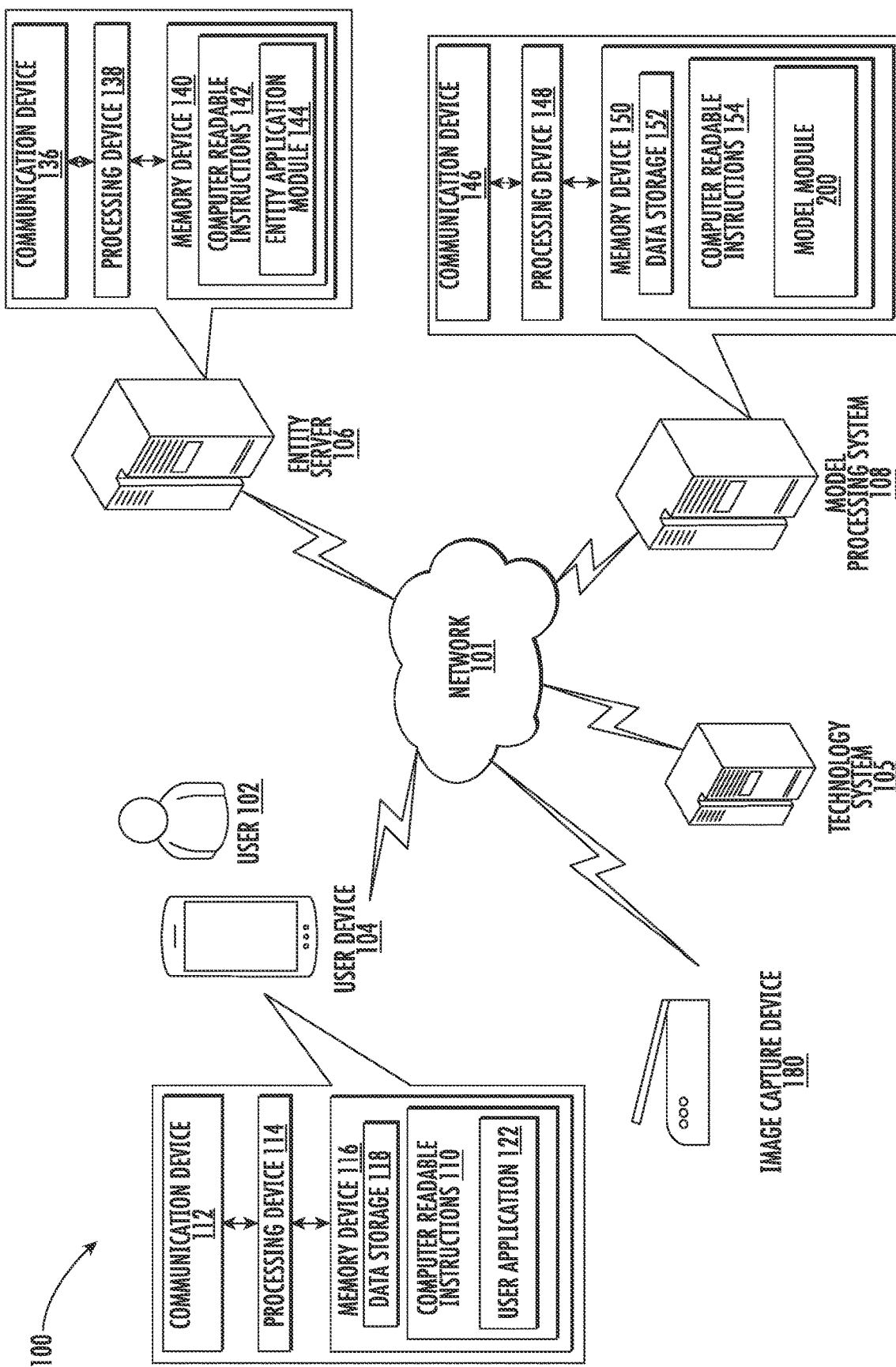
Figure 2:
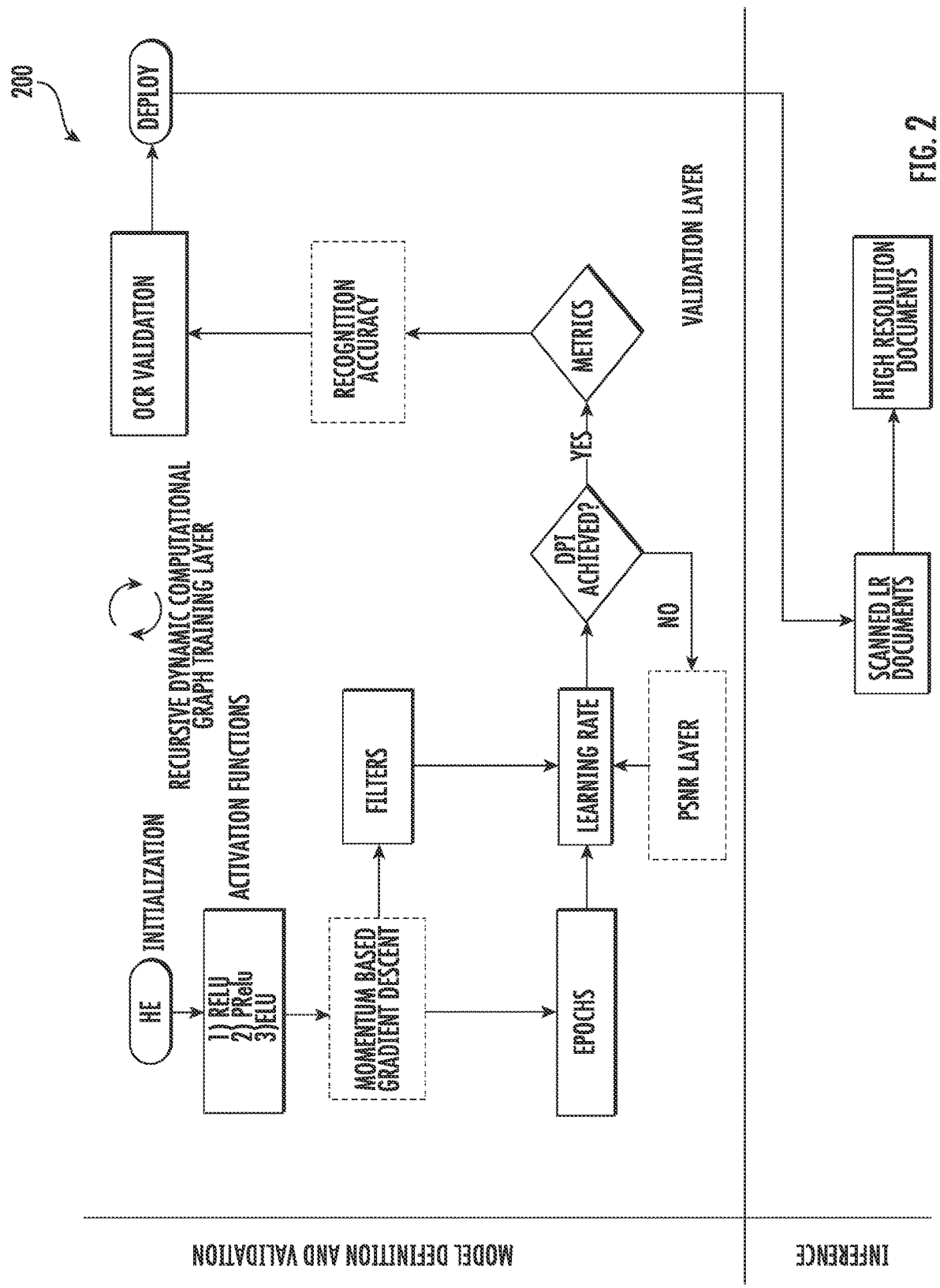
Figure 3:
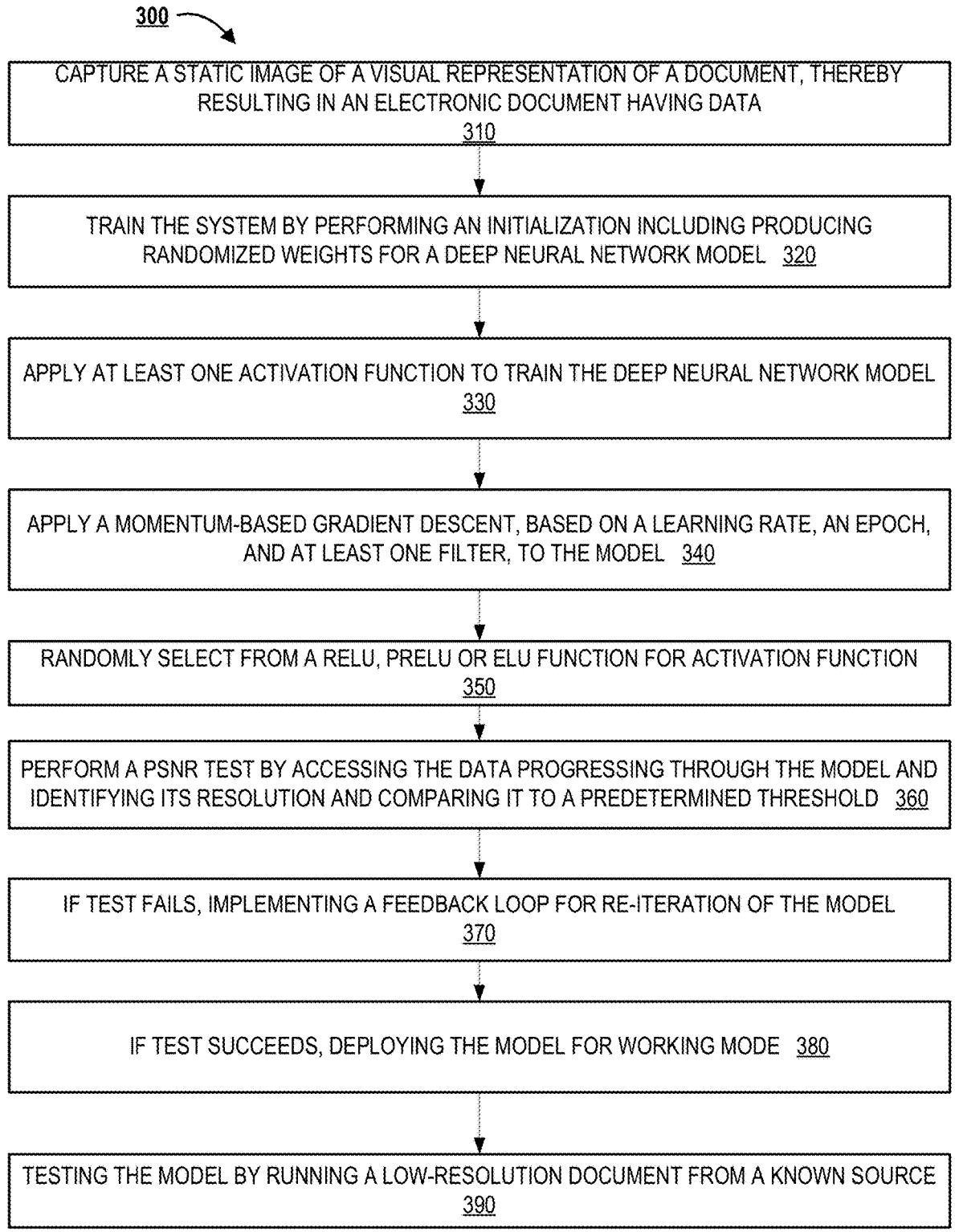

Having thus described embodiments of the invention in general terms, reference will now be made to the accompanying drawings, wherein:

FIG. 1 depicts a system environment 100, in accordance with one embodiment of the present invention;

FIG. 2 depicts a flowchart in accordance with one embodiment of the present invention; and FIG. 3 depicts another flowchart in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

In some embodiments, an "entity" or "enterprise" as used herein may be any institution employing information technology resources and particularly technology infrastructure configured for large scale processing of electronic files, electronic technology event data and records, and performing/processing associated technology activities. In some instances, the entity's technology systems comprise multiple technology applications across multiple distributed technology platforms for large scale processing of technology activity files and electronic records. As such, the entity may be any institution, group, association, financial institution, establishment, company, union, authority or the like, employing information technology resources.

As described herein, a "user" is an individual associated with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer. In other embodiments, a user may be a system performing one or more tasks described herein.

In the instances where the entity is a financial institution, a user may be an individual or entity with one or more relationships affiliations or accounts with the entity (for example, a financial institution). In some embodiments, the user may be an entity or financial institution employee (e.g., an underwriter, a project manager, an IT specialist, a manager, an administrator, an internal operations analyst, bank teller or the like) capable of operating the system described herein. In some embodiments, a user may be any individual or entity who has a relationship with a customer of the entity or financial institution. For purposes of this invention, the term "user" and "customer" may be used interchangeably. A "technology resource" or "account" may be the relationship that the user has with the entity. Examples of technology resources include a deposit account, such as a transactional account (e.g. a banking account), a savings account, an investment account, a money market account, a time deposit, a demand deposit, a pre-paid account, a credit account, a non-monetary user profile that includes only personal information associated with the user, or the like. The technology resource is typically associated with and/or maintained by an entity.

As discussed above, the accuracy of optical character recognition (OCR) on low-resolution, scanned documents is very low. Institutions, particularly financial institutions, handle low-resolution, scanned documents frequently in their daily interactions. Because of the low resolution of such documents, an automated pipeline within a document processing system may require manual intervention and/or error mitigation actions. Such difficulties may cause large delays in business workflows and service level agreement (SLA) impacts.

Most of the existing deep learning super resolution (SR) techniques are designed for natural images and their efficiencies are below par with respect to document images. Another drawback to such techniques is that they are also computationally intensive.

The present invention circumvents all the above-noted issues using a construction of dynamic computational graph and leveraging varying hyper parameters including activation functions, momentum-based stochastic gradient descent (SGD) or incremental gradient descent, which is an iterative method for optimizing a differentiable objection function, a peak-signal-to-noise ratio (PSNR) that provides feedback to training layers, and OCR validation.

Therefore, embodiments of the invention are directed to systems, methods, and computer program products for approaching less spatial resolution documents with parameterized and evolution linear units and momentum-driven SGD to accelerate the training phase of the system further. An up-sampling layer is integrated with dots-per-inch (DPI) to validate whether the desirable output is obtained.

Embodiments of the invention include various novel concepts. For example, a computation graph is completely dynamic and configurable. Embodiments apply rectified linear units (RELU) for the first time in a parameterized format. Further, the system monitors the PSNR throughout the training loop and hyper parameters are updated to achieve the goal. Furthermore, recognition accuracy is determined using the OCR engine. Finally, validation against the Tesseract OCR software is integrated within the training phase. The Tesseract OCR software is a freely available optical character recognition engine for various operating system that was released under the Apache License with development sponsored by Google.

FIG. 1 illustrates a system environment 100, in accordance with some embodiments of the present invention. As illustrated in FIG. 1, a model processing system 108 is in operative communication with and operatively coupled to, via a network 101, a user device 104, an entity server 106, a technology system 105, and an image capture device 180. In this way, the model processing system 108 can send information to and receive information from the user device 104, the entity server 106, the technology system 105 and the image capture device 180. FIG. 1 illustrates only one example of an embodiment of the system environment 100, and it will be appreciated that in other embodiments one or more of the systems, devices, or servers may be combined into a single system, device, or server, or be made up of multiple systems, devices, or servers. In this way, a model module 200 of the model processing system 108, is configured for performing one or more of the method or process steps discussed herein.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101.

In some embodiments, the user 102 may be one or more individuals or entities that may provide static images (e.g., via the image capture device 180.

FIG. 1 also illustrates a user system 104. The user device 104 may be, for example, a desktop personal computer, a mobile system, such as a cellular phone, smart phone, personal data assistant (PDA), laptop, a server system, another computing system and/or the like. The user device 104 generally comprises a communication device 112, a processing device 114, and a memory device 116. The user device 104 is typically a computing system that is configured to enable user and device authentication for access to technology event data, request construction of high resolution documents, receive the generated high resolution documents, etc. The processing device 114 is operatively coupled to the communication device 112 and the memory device 116. The processing device 114 uses the communication device 112 to communicate with the network 101 and other devices on the network 101, such as, but not limited to, the entity server 106, the model processing system 108 and the technology system 105. As such, the communication device 112 generally comprises a modem, server, or other device for communicating with other devices on the network 101.

The user device 104 comprises computer-readable instructions 110 and data storage 118 stored in the memory device 116, which in one embodiment includes the computer-readable instructions 110 of a user application 122. In some embodiments, the model processing system 108 and/or the entity system 106 are configured to cause the processing device 114 to execute the computer readable instructions 110, thereby causing the user device 104 to perform one or more functions described herein, for example, via the user application 122 and the associated user interface of the user application 122.

FIG. 1 also illustrates an image capture device 180. In some embodiments, the image capture device 180 is typically configured to capture a 2-D image of a physical, tangible object, thereby converting it into an electronic file/document. The image capture device 180 may be/or may comprise, for example, a scanner, a camera, a light sensor, a magnetic reader, and/or the like. In some embodiments, the image capture device 180 is a part of, or is integral with the model processing system 108. In some embodiments, the image capture device 180 is a part of, or is integral with the entity server 106. In some embodiments, the image capture device 180 is a part of, or is integral with the user device 104.

As further illustrated in FIG. 1, the model processing system 108 generally comprises a communication device 146, a processing device 148, and a memory device 150. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device, such as the processing device 148, typically includes functionality to operate one or more software programs and/or modules, which may be stored in a memory device, for example, executing computer readable instructions 154 or computer-readable program code 154 stored in memory device 150 to perform one or more functions associated with a model module 200.

The processing device 148 is operatively coupled to the communication device 146 and the memory device 150. The processing device 148 uses the communication device 146 to communicate with the network 101 and other devices on the network 101, such as, but not limited to the entity server 106, the technology system 105, the image capture device 180 and the user system 104. As such, the communication device 146 generally comprises a modem, server, or other device for communicating with other devices on the network 101.

As further illustrated in FIG. 1, the model processing system 108 comprises the computer-readable instructions 154 stored in the memory device 150, which in one embodiment includes the computer-readable instructions 154 of the model module 200. In some embodiments, the computer readable instructions 154 comprise executable instructions associated with the model module 200, wherein these instructions, when executed, are typically configured to cause the applications or modules to perform/execute one or more steps described herein. In some embodiments, the memory device 150 includes data storage 152 for storing data related to the system environment, but not limited to data created and/or used by the model module 200 and its components/modules. The model module 200 is further configured to perform or cause other systems and devices to perform the various steps in processing electronic records, as will be described in detail later on.

As such, the processing device 148 is configured to perform some or all of the steps described throughout this disclosure, for example, by executing the computer readable instructions 154. In this regard, the processing device 148 may perform one or more steps singularly and/or transmit control instructions that are configured to the model module 200, entity server 106, user device 104, and technology system 105 and/or other systems and applications, to perform one or more steps described throughout this disclosure. Although various data processing steps may be described as being performed by the model module 200 and/or its components/applications and the like in some instances herein, it is understood that the processing device 148 is configured to establish operative communication channels with and/or between these modules and applications, and transmit control instructions to them, via the established channels, to cause these module and applications to perform these steps.

Embodiments of the model processing system 108 may include multiple systems, servers, computers or the like maintained by one or many entities. FIG. 1 merely illustrates one of those systems 108 that, typically, interacts with many other similar systems to form the information network. In one embodiment of the invention, the model processing system 108 is operated by the entity associated with the entity server 106, while in another embodiment it is operated by a second entity that is a different or separate entity from the entity server 106. In some embodiments, the entity server 106 may be part of the model processing system 108. Similarly, in some embodiments, the model processing system 108 is part of the entity server 106. In other embodiments, the entity server 106 is distinct from the model processing system 108.

In one embodiment of the model processing system 108, the memory device 150 stores, but is not limited to, the model module 200, as will be described later on with respect to FIG. 2. In one embodiment of the invention, the model module 200 may associated with computer-executable program code that instructs the processing device 148 to operate the network communication device 146 to perform certain communication functions involving the technology system 105, the user device 104 and/or the entity server 106, as described herein. In one embodiment, the computer-executable program code of an application associated with the model module 200 may also instruct the processing device 148 to perform certain logic, data processing, and data storing functions of the application.

The processing device 148 is configured to use the communication device 146 to receive data, such as electronic data files (e.g., static images), receive requests, transmit and/or cause display of generated documents, and the like. In the embodiment illustrated in FIG. 1 and described throughout much of this specification, the model module 200 may perform one or more of the functions described herein, by the processing device 148 executing computer readable instructions 154 and/or executing computer readable instructions associated with one or more application(s)/devices/components of the model module 200.

As illustrated in FIG. 1, the entity server 106 is connected to the model processing system 108 and may be associated with a model component database, model technology code database, may be associated with model data sources, may be associated with a financial institution network, etc. In this way, while only one entity server 106 is illustrated in FIG. 1, it is understood that multiple network systems may make up the system environment 100 and be connected to the network 101. The entity server 106 generally comprises a communication device 136, a processing device 138, and a memory device 140. The entity server 106 comprises computer-readable instructions 142 stored in the memory device 140, which in one embodiment includes the computer-readable instructions 142 of an institution application 144. The entity server 106 may communicate with the model processing system 108. The model processing system 108 may communicate with the entity server 106 via a secure connection generated for secure encrypted communications between the two systems for communicating data for processing across various applications.

As further illustrated in FIG. 1, in some embodiments, the technology event processing system environment 100 further comprises a technology system 105, in operative communication with the model processing system 108, the entity server 106, and/or the user device 104. Typically, the technology system 105 comprises a communication device, a processing device and memory device with computer readable instructions. In some instances, the technology system 105 comprises a first database/repository comprising model component objects, and/or a second database/repository comprising functional source code associated with model component objects. These applications/databases may be operated by the processor executing the computer readable instructions associated with the technology system 105, as described previously. In some instances, the technology system 105 is owned, operated or otherwise associated with third party entities, while in other instances, the technology system 105 is operated by the entity associated with the systems 108 and/or 106. Although a single external technology system 105 is illustrated, it should be understood that, the technology system 105 may represent multiple technology servers operating in sequentially or in tandem to perform one or more data processing operations.

It is understood that the servers, systems, and devices described herein illustrate one embodiment of the invention. It is further understood that one or more of the servers, systems, and devices can be combined in other embodiments and still function in the same or similar way as the embodiments described herein.

Referring now to FIG. 2, a flowchart illustrating a method for transformation of electronic documents by low-resolution intelligent up-sampling is shown. FIG. 2 includes a recursive dynamic computational graph training layer is shown according to an embodiment of the invention is shown. This process, as discussed above, enables performing of an automated super-resolution on scanned documents. We assume in this system that the resolution of the inputted scanned documents is very low. This process increases the resolution of the scanned documents.

Training Mode

The top layer in the figure is the training and validation layer, and the bottom layer is the inference layer. The system is initialized by running a set of known high-resolution documents through in order to determine the system is functioning properly. More specifically, in the top layer, we take data with high resolution and use it as a standard by which we can compare our outputted data from the model to ensure it is producing accurate high resolution data from inputted low resolution data. So, we will take a group of high resolution documents and feed them through the system to ensure the system is functioning properly and accurately. We can also take a group of low-resolution documents (from the same source) and run them through the system, which up-samples the documents to the desired dots-per-inch. The results may be compared to confirm the model is functioning properly. Periodically, the system may be "checked" by running a set of high-resolution documents and a corresponding set of low-resolution documents through the system in order to ensure the system is accurately up-sampling the set of low-resolution documents into the desired DPI.

In some applications, the low-resolution documents inputted into the system are down-sampled from the set of high-resolution documents by addition of noise in the documents.

Upon determination that the model is accurately up-sampling the resolution of the documents, the model may be deployed into a pipeline of working documents, also known as placing the model into a "working" mode, whereby a set of low-resolution documents from a normal workflow may be inputted into the system and run through a number of iterations of the system in order to achieve a desired output dots-per-inch.

Recursive Dynamic Computational Graph Training Layer

The first step in the model is the initialization step, which is a "He et al." or (HE) initialization, which is similar to a "Xavier" initialization. A HE initialization is a method of whereby weights are initialized keeping in mind the size of the previous layer, which helps in attaining a global minimum of the cost function faster and more efficiently. The weights are still random but differ in range depending on the size of the previous layer. This provides a controlled initialization and, thereby, a faster and more efficient gradient descent. In summary, the HE initialization step produces randomized weights for the model.

The second step in the model is to apply activation function(s) in order to better train the deep neural network embodied in the model. Examples of possible activation functions include rectified linear unit (RELU), the parametric rectified linear unit (PRelu) and the exponential linear unit (ELU) functions. The ELU tries to make the mean activations closer to zero, which speeds up learning of the model. It has been shown that ELUs can obtain higher classification accuracy than RELUs.

The purpose of the activation functions is to convert the linear output from the weighted values of the HE initialization to non-linear values. The activation functions can be equated to logarithmic functions where the output will be between zero and one. Embodiments of the invention randomly selects one of the activation functions from the group of the RELU, PRELU and ELU functions.

The RELU function is a normal activation function that converts all the parameters (e.g., pixel coordinates) into non-linear parameters.

The PRELU function only chooses selected parameters based on the weights and returns the linearity of other pixels.

The ELU function is similar to the PRELU function but it also attempts to convert all the non-selected parameters. It converts the parameters using a different formula than the PRELU.

Once the randomly selected activation function has been applied, the model moves to the momentum-based gradient descent step, which is a way of optimizing using differential calculus. In this step, the model is making sure that the difference between a prediction and the output is very low. The model goes through several iterations of gradient descent applied to the data. The model looks for specific batches.

The gradient descent is based on the learning rate. During the model training phase, we will fix the learning rate. The Epochs is the number of iterations that we are going to run the model. This is a variable that can be changed by the user.

The filters are parameters to momentum-based gradient descent. The filters are implemented to check to see if the critical parameters have been captured by the model. It will automatically update the learning rate as necessary to ensure that the critical parameters have been captured.

The PSNR layer accesses the data and identifies the DPI. It does so by determining a peak signal-to-noise ratio of the data in order to determine whether the document is considered high resolution or low resolution. There may be set a threshold resolution and if the PSNR layer determines that the threshold resolution has not yet been achieved then it implements a feedback loop whereby the data is transferred back through the model for another iteration.

The feedback loop may go all the way back to the activation function step, the epochs may be changed, the learning rate may be changed and/or the filters may be changed in response to the PSNR layer sending the data through for another iteration.

Validation Layer

Once the DPI has been satisfied, then the process moves to the validation layer. Then we take the original high-resolution document and the generated high-resolution document into the recognition engine for OCR validation. This is the check to ensure the model is functioning to the high standards necessary for deployment. The question the system asks is how the generated high-resolution documents perform in comparison to the original high-resolution documents as outputs from the OCR validation step. The system then validates the differences between the documents in order to confirm that the generated high-resolution documents are sufficient for deployment of the model. We can compare the differences between the documents to a threshold level of differences to confirm the documents are one and the same and ready for the model to be deployed.

Working Mode

Once the model has been confirmed ready for deployment, the model receives low-resolution documents and up-samples the low-resolution documents into generated high-resolution documents. These high-resolution documents are then re-inserted into the normal document workflow of the institution, such as the financial institution.

As mentioned previously, the system may be "re-initialized" periodically such that a set of known low-resolution documents may be up-sampled and compared to its corresponding set of high-resolution documents in order to ensure the model is functioning accurately. In such re-initialization, the epochs, filters, and learning rates may be adjusted to re-initialize the model for subsequent working mode document up-samplings.

Referring now to FIG. 3, a flowchart illustrates a method 300 for transformation of electronic documents by low-resolution intelligent up-sampling, according to embodiments of the invention. The first step, as illustrated by box 310 is to capture a static image of a visual representation of a document, thereby resulting in an electronic document having data.

The next step, as represented by block 320, is to train the system by performing an initialization including producing randomized weights for a deep neural network model.

The next step, as represented by block 330, is to apply at least one activation function to train the deep neural network model.

The next step, as represented by block 340, is to apply a momentum-based gradient descent to the model. In some embodiments the momentum-based gradient descent is based on a learning rate, an epoch, and/or at least one filter.

In various embodiments, as represented by block 350, the method includes randomly selecting the activation function from a RELU, PRELU or ELU function.

In various embodiments, as represented by block 360, the method includes performing a PSNR test by accessing the data progressing through the model and identifying its resolution. Then, the method may include comparing the resolution determined by the PSNR test to a predetermined threshold.

In some embodiments, if the test and comparison fails, then the system implements a feedback loop for re-iteration of the model, as represented by block 370.

In some embodiments, if the test and comparison succeeds, then the system deploys the model for working mode, as represented by block 380.

Finally, periodically or regularly, the system may be tested for accuracy as represented by block 390 by running a low-resolution document from a known source through the model as discussed above.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for transformation of electronic documents by low-resolution intelligent up-sampling, the system comprising:
   at least one memory device with computer-readable program code stored thereon;
   at least one communication device;
   at least one processing device operatively coupled to the at least one memory device and the at least one communication device, wherein executing the computer-readable program code is configured to cause the at least one processing device to:
   capture a static image of a visual representation of a document, thereby resulting in an electronic document having data;
   train the system by:
      performing an initialization comprising producing randomized weights for a deep neural network model;
      applying at least one activation function to train the deep neural network model; and
      applying a gradient to the model; and
   apply the model to the data to produce a transformed electronic document.

2. The system of claim 1, wherein executing the computer-readable code is configured to further cause the at least one processing device to apply the at least one activation function comprising converting a linear output from the weighted values of the initialization into non-linear values.

3. The system of claim 1, wherein executing the computer-readable code is configured to further cause the at least one processing device to randomly select at least from a rectified linear unit (RELU) function, a parametric RELU (PRELU) function, or an exponential linear unit (ELU) function for application as the at least one activation function.

4. The system of claim 1, wherein executing the computer-readable code is configured to further cause the at least one processing device to:
   applying a momentum-based gradient descent to the model, thereby optimizing the model through differential calculus.

5. The system of claim 1, wherein executing the computer-readable code is configured to further cause the at least one processing device to:
   determine that the model is ready for deployment;
   in response, deploy the model for receiving new low-resolution electronic documents and up-sampling those documents, thereby transforming the low-resolution electronic documents into generated high-resolution documents.

6. The system of claim 3, wherein executing the computer-readable code is configured to further cause the at least one processing device to select the RELU function as the at least one activation function, wherein the RELU function comprises a normal activation function that converts all parameters of the electronic document into non-linear parameters.

7. The system of claim 3, wherein executing the computer-readable code is configured to further cause the at least one processing device to select the PRELU function as the at least one activation function, wherein the PRELU function comprises selecting some parameters of the electronic document based on the weights, converting the selected parameters to non-linear parameters, and retaining the non-selected parameters as linear parameters.

8. The system of claim 3, wherein executing the computer-readable code is configured to further cause the at least one processing device to select the ELU function as the at least one activation function, wherein the ELU function comprises selecting some parameters of the electronic document based on the weights, converting the selected parameters to non-linear parameters.

9. The system of claim 4, wherein applying the gradient descent comprises performing multiple iterations of the gradient descent until a difference between a pre-calculated prediction and a gradient descent output is below a predetermined threshold.

10. The system of claim 4, wherein the gradient descent is based on a learning rate.

11. The system of claim 5, wherein determining that the model is ready for deployment comprises:
   running a low-resolution electronic document of known source through the model so that a test high-resolution document is generated;
   comparing differences between the test high-resolution document to a known high-resolution document of the known source; and
   when the differences surpass a predetermined threshold, the model has failed the test and must be re-trained.

12. The system of claim 5, wherein determining that the model is ready for deployment comprises:
   running a low-resolution electronic document of known source through the model so that a test high-resolution document is generated;
   comparing differences between the test high-resolution document to a known high-resolution document of the known source; and
   when the differences are less than a predetermined threshold, the model has passed the test and may be deployed for working mode.

13. The system of claim 9, wherein the gradient descent is based on an epochs number comprising a user input indicating a maximum number of the multiple iterations.

14. The system of claim 9, wherein applying the gradient descent comprises filters that are implemented to determine that all critical parameters have been captured by the model.

15. The system of claim 14, wherein applying the gradient descent further comprises automatically updating the learning rate as necessary to ensure that the critical parameters have been captured.

16. The system of claim 15, wherein executing the computer-readable code is configured to further cause the at least one processing device to perform a peak signal-to-noise ratio (PSNR) test by accessing the data progressing through the model and identifying its resolution and comparing it to a predetermined threshold.

17. The system of claim 16, wherein executing the computer-readable code is configured to further cause the at least one processing device to, if the resolution is below the predetermined threshold, then implementing a feedback loop for re-iteration of the model, whereby the data is transferred back for re-applying of the activation function, re-applying the momentum-based gradient descent and re-testing the PSNR.

18. The system of claim 17, wherein executing the computer-readable code is configured to further cause the at least one processing device to update the epochs, the filters and the learning rate in response to implementing the feedback loop.

19. A computer program product for transformation of electronic documents by low-resolution intelligent up-sampling, the computer program product comprising a non-transitory computer-readable storage medium having computer-executable instructions to:
    capture a static image of a visual representation of a document, thereby resulting in an electronic document having data;
    train the system by:
        performing an initialization comprising producing randomized weights for a deep neural network model;
        applying at least one activation function to train the deep neural network model; and
        applying a gradient to the model; and
    apply the model to the data to produce a transformed electronic document.

20. A computer implemented method for transformation of electronic documents by low-resolution intelligent up-sampling, the computer implemented method comprising:
    capturing a static image of a visual representation of a document, thereby resulting in an electronic document having data;
    training the system by:
        performing an initialization comprising producing randomized weights for a deep neural network model;
        applying at least one activation function to train the deep neural network model; and
        applying a gradient to the model; and
    applying the model to the data to produce a transformed electronic document.

\* \* \* \* \*